UNITED STATES PATENT OFFICE.

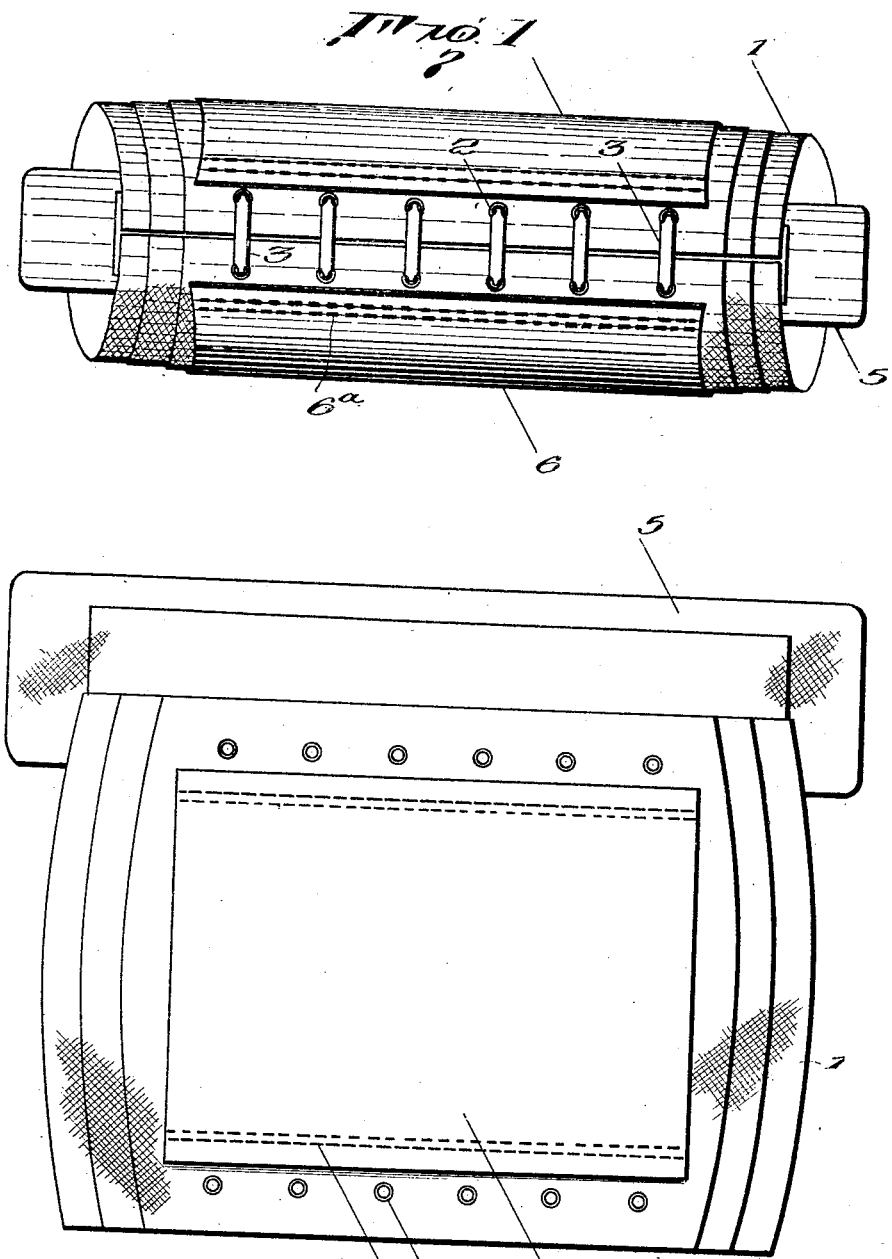

JOHN A. BARNES, OF DALLAS, TEXAS, ASSIGNOR TO FOWLER-WILLIAMS COMPANY, OF DALLAS, TEXAS.

BLOW-OUT BOOT.

1,364,677.     Specification of Letters Patent.     Patented Jan. 4, 1921.

Application filed May 26, 1920. Serial No. 384,395.

*To all whom it may concern:*

Be it known that I, JOHN A. BARNES, a citizen of the United States, residing at Dallas, in the county of Dallas and State of Texas, have invented certain new and useful Improvements in Blow-Out Boots, of which the following is a specification.

My invention relates to blow out boots such as are used within a pneumatic automobile tire to strengthen and reinforce the tire at a point where it has become weakened due to a blow-out or hole therein. Such articles heretofore used have been open to many and various objections and have been a continual source of trouble while in use. Prominent among the disadvantages of the usual construction of these boots is that when this boot is disposed within a tire as a reinforce for a blow-out hole therein, and the tire is rotating while in position on the wheel of a moving motor vehicle, this former type of boot has the tendency to create an intermittent valve like suction action at the blow-out hole at the times when the load comes on and off at this point during the rotation of the wheel. As a result of this valve like action, water, dirt, sand, and other foreign substances are sucked into the space between the blow-out boot and the inner surface of the tire and eventually work around until they lodge between the inner surface of the tire and the inner tube therein. The destructive results both to the inner tube and to the tire are considerable, and very often total ruination of the tube or the tire, or both, is caused.

One object of my invention, therefore, is to provide a blow-out boot which by reason of its structure will effectually prevent this valve-like action, and will act as a gasket to close the blow-out hole in the tire casing at all times during the rotation of the wheel carrying the tire, and thereby exclude all water and foreign substances from entrance into the interior of the tire casing.

Another object of my invention is to provide a blow-out boot so constructed as to be of greatly improved wearing qualities, which is of such a construction that the fabric of which the boot is largely composed does not come into contact with the road and thereby is not injured as is the case with the usual types of these boots.

A further object of my invention is to provide a blow-out boot which will not creep, particularly when the pressure of air within the inner tube is low, but which will remain in the position within the tire in which it was placed and continuously reinforce the tire at the weakened portion of the same.

I will now proceed to describe in detail the invention by which I obtain these advantageous results.

In the drawings forming part of this specification and in which like reference characters indicate like parts in the several views;

Figure 1 is a plan view of my improved blow-out boot with the two edges laced together.

Fig. 2 is a plan view of the same extended to its full width.

Referring to the drawings, numeral 1 indicates a blow-out boot made in accordance with my invention, the body of which is constructed of a plurality of laminations of fabric as is usual in such articles.

At opposite edges of the boot is a lacing arrangement, which serves as a means whereby the edges of the boot may be joined, surrounding the inner tube and completely inclosing the same throughout the length of the boot. The particular lacing means which I have illustrated comprises a series of eyelets 2 formed in both edges of the boot, and which are adapted to receive a lace 3 which is passed alternately through the eyelets and joins the two edges together as clearly shown in Fig. 1 thus making an absolutely secure fastening that lies snugly and flatly against the rim when the tire is thereon, yet has sufficient play to allow the boot to cling to the inner tube around which it is laced and thus prevent the boot from creeping on the tube.

A protecting strip 5, preferably formed of several layers of fabric, is attached to the boot along one of its edges by a line of stitching and is adapted, when the boot is laced around a tube, to be interposed between the tube and the locking members so as to prevent any possibility of the tube becoming pinched at that point.

Attached to the outer side of the laminations of fabric composing the boot is a sheet of rubber, 6. This sheet of rubber, or apron, as I prefer to call it, is attached to the boot by two lines of stitching, $6^a$—$6^a$ at opposite edges, and throughout the remainder of its area is loose upon the boot and independent therefrom. This apron is constructed for the purpose of preventing any valve like action of the boot and when in position adjacent the inner surface of the tire casing, lies smoothly between the inner tube and the inner side of the casing at the point where the puncture or blow-out in the casing has occurred, and by its elasticity fits so snugly over the hole when the tube is inflated as to act as a gasket and stop the valve-like action or suction that draws water, sand, dirt and other foreign substances into the space between the blow-out boot and the casing, unless thus prevented. This rubber apron also protects the fabric of the boot from contact with the road and the subsequent wear thereof, especially when the hole in the casing is of considerable size. Furthermore, this apron prevents the boot from creeping with relation to the casing, particularly when the air pressure within the inner tube is low, and retains the boot in its proper position at all times. The provision of this apron as an independent element of the boot, attached thereto merely by the two lines of stitching, is the particular novelty of my invention, and the means whereby the above mentioned highly desirable improvements are effected.

While I have illustrated one form of locking means for the boot, it is to be understood that this is merely for the purpose of illustration, and my apron could equally well be used with any boot having other means to retain it in place, either of the type of boot that locks around the inner tube, or of the type that is attached to the tire rim and is commonly known as a "wing" boot.

While I find it more desirable to secure the apron to the boot by the lines of stitching at two edges, as shown, it is also to be understood that it could be otherwise secured without departing from the spirit of my invention, so long as the apron is free from the boot throughout the greater part of its area.

Having thus described my invention what I claim as new and desire to secure by Letters Patent is:

1. A blow-out boot having on its outer surface a sheet of rubber, loose therefrom throughout its greater area.

2. A blow-out boot composed of a plurality of laminations, the outer of said laminations being of different material from the other laminations and being detached therefrom throughout its greater area, said inner lamination being formed of a material possessing greater flexibility than that of the other laminations.

3. A blow-out boot composed of a plurality of laminations, the outer of which is of rubber and detached throughout its greater area.

4. A blow-out boot comprising a body formed of a plurality of laminations, and a rubber sheet attached at a plurality of its edges to the outer surface of said body, and loose therefrom throughout its remaining area.

In testimony whereof I affix my signature.

JOHN A. BARNES.